(12) United States Patent
Roskowski (10) Patent No.: US 11,086,760 B2
(45) Date of Patent: *Aug. 10, 2021

(54) DELTA STATE TRACKING FOR EVENT STREAM ANALYSIS

(71) Applicant: AT&T MOBILITY IP, LLC, Atlanta, GA (US)

(72) Inventor: Steve Roskowski, Los Gatos, CA (US)

(73) Assignee: AT&T MOBILITY IP, LLC, Atlanta, GA (US)

(*) Notice: Subject to any disclaimer, the term of this patent is extended or adjusted under 35 U.S.C. 154(b) by 166 days.

This patent is subject to a terminal disclaimer.

(21) Appl. No.: 16/279,655

(22) Filed: Feb. 19, 2019

(65) Prior Publication Data

US 2019/0179729 A1 Jun. 13, 2019

Related U.S. Application Data

(63) Continuation of application No. 11/777,949, filed on Jul. 13, 2007, now Pat. No. 10,210,071.

(Continued)

(51) Int. Cl.
*G06F 11/36* (2006.01)
*G06F 11/34* (2006.01)
*G06F 11/30* (2006.01)

(52) U.S. Cl.
CPC ...... *G06F 11/3656* (2013.01); *G06F 11/3006* (2013.01); *G06F 11/3051* (2013.01);
(Continued)

(58) Field of Classification Search
CPC ............. G06F 11/3656; G06F 11/3006; G06F 11/3051; G06F 11/3452; G06F 11/3476; G06F 2201/84; G06F 2201/86; H04L 41/0631; H04L 41/064; H04L 41/065; H04L 41/142; H04L 41/16;
(Continued)

(56) References Cited

U.S. PATENT DOCUMENTS 5,872,909 A * 2/1999 Wilner ................ G06F 11/0715
714/38.12
5,889,474 A 3/1999 LaDue
(Continued)

OTHER PUBLICATIONS

D. M. Zimmerman and K. M. Chandy, "Snapshot Processing in Streaming Environments", 2006 7th IEEE/ACM International Conference on Grid Computing, Barcelona, 2006, pp. 319-320.
(Continued)

*Primary Examiner* — Christopher Biagini
(74) *Attorney, Agent, or Firm* — Amin, Turocy & Watson, LLP (57) ABSTRACT

Systems and methods for delta state tracking for event stream analysis. Events at a device are tracked and stored locally or forwarded to a server. The events collectively form an event stream. When an event of interest occurs, the precise configuration of a device at the time of the event of interest can be determined by applying the event stream in chronological or reverse chronological order to a snapshot of the device's configuration. Thus, the snapshot can be taken at any time. Tracking the deltas to the device's configuration enables the precise configuration at the time of the event of interest to be determined.

20 Claims, 3 Drawing Sheets

Related U.S. Application Data (60) Provisional application No. 60/807,443, filed on Jul. 14, 2006.

(52) U.S. Cl.
CPC ...... *G06F 11/3452* (2013.01); *G06F 11/3476* (2013.01); *G06F 2201/84* (2013.01); *G06F 2201/86* (2013.01)

(58) Field of Classification Search
CPC . H04L 41/5009; H04L 41/5019; H04L 43/00; H04L 43/06; H04L 43/08; H04L 43/0817; H04L 43/10; H04L 43/50; H04L 47/14; H04W 24/00; H04W 24/04; H04W 24/08; H04W 24/10
USPC .......................................................... 709/224
See application file for complete search history.

(56) References Cited

U.S. PATENT DOCUMENTS

| | | | |
|---|---|---|---|
| 6,097,336 A | | 8/2000 | Stilp |
| 6,167,358 A * | | 12/2000 | Othmer ............... G06F 11/0748 702/188 |
| 6,205,326 B1 | | 3/2001 | Tell et al. |
| 6,266,788 B1 | | 7/2001 | Othmer et al. |
| 6,324,656 B1 * | | 11/2001 | Gleichauf ............... H04L 41/12 714/37 |
| 6,484,203 B1 | | 11/2002 | Porras et al. |
| 6,516,198 B1 | | 2/2003 | Tendler |
| 6,529,136 B2 | | 3/2003 | Cao et al. |
| 6,604,210 B1 * | | 8/2003 | Alexander, III .... G06F 11/3636 714/39 |
| 6,745,011 B1 | | 6/2004 | Hendrickson et al. |
| 6,754,470 B2 | | 6/2004 | Hendrickson et al. |
| 6,848,106 B1 | | 1/2005 | Hipp |
| 6,850,945 B2 | | 2/2005 | Lanzatella |
| 7,581,220 B1 * | | 8/2009 | Roeck ..................... G06F 9/542 711/100 |
| 7,805,434 B2 * | | 9/2010 | Alcorn ..................... G06F 16/22 707/713 |
| 7,823,153 B1 | | 10/2010 | Pashenkov |
| 2002/0072359 A1 | | 6/2002 | Moles et al. |
| 2003/0159088 A1 | | 8/2003 | Phillips et al. |
| 2004/0024859 A1 * | | 2/2004 | Bloch .................... H04L 41/20 709/223 |
| 2006/0007870 A1 | | 1/2006 | Roskowski et al. |
| 2006/0007901 A1 | | 1/2006 | Roskowski et al. |
| 2006/0023642 A1 | | 2/2006 | Roskowski et al. |
| 2006/0211415 A1 | | 9/2006 | Cassett et al. |
| 2006/0265406 A1 | | 11/2006 | Chkodrov et al. |
| 2007/0179934 A1 | | 8/2007 | Basov et al. |
| 2007/0207800 A1 * | | 9/2007 | Daley .................... H04L 43/00 455/425 |

OTHER PUBLICATIONS

Lamperti and M. Zanella, "A bridged diagnostic method for the monitoring of polymorphic discrete-event systems", IEEE Transactions on Systems, Man, and Cybernetics, Part B (Cybernetics), vol. 34, No. 5, pp. 2222-2244, Oct. 2004.

* cited by examiner

DELTA STATE TRACKING FOR EVENT STREAM ANALYSIS

CROSS REFERENCE TO RELATED APPLICATIONS

This application is a Continuation of U.S. patent application Ser. No. 11/777,949 filed Jul. 13, 2007, and scheduled to issue as U.S. Pat. No. 10,210,071 on Feb. 19, 2019, which claims the benefit of U.S. Application Ser. No. 60/807,443, filed Jul. 14, 2006 and entitled DELTA STATE TRACKING FOR EVENT STREAM ANALYSIS, which applications are incorporated by reference in their entirety.

BACKGROUND OF THE INVENTION

1. The Field of the Invention

The present invention relates generally to communications networks and related systems and devices. More particularly, embodiments of the invention relate to systems and methods for event stream analysis of wireless communications networks including wireless devices.

2. The Relevant Technology

As a result of advances in technology and increases in the number of network connected devices and associated users, the size and complexity of communications networks including wireless networks has greatly increased. An inevitable consequence of such increases in size and complexity has been a relative increase in operational and performance problems associated with communications networks. Reliability issues, such as dropped calls, lack of coverage, device issues, user errors, and poor audio quality have an impact on users. As new services are introduced that use even more complex technology, exercise different usage modalities, and place additional demands on networks, network performance continues to be an important concern for wireless communications providers. Therefore, improving quality of service is a top priority for wireless communications providers.

Typical approaches to network monitoring include "self-monitoring" where a network device or system reports on its own status and performance and reports any errors that occur during its operation. The resulting operational metrics from a single device can sometimes be indicative of a broader, system-wide problem, but rather than providing answers, problem resolution entails guesswork and extended troubleshooting, which wastes valuable resources.

Another monitoring approach known in the art involves pre-programmed service monitors, where specific elements perform service transactions to emulate "real-world" transaction activity; end to end performance is then monitored and the results reported. While these solutions catch systematic failures, they cannot detect intermittent or dispersed problems, subtle impairments, or device or end user specific issues. Further, they can only test anticipated usage scenarios and fail to adapt to new usages and interactions between services.

Another approach to analyzing the overall performance of a system involves tracking a series of events from the devices that perform the operations. In particular, wireless devices can be instrumented to collect event data that represents the sequence of events that occur on the device. Some of these may be identified as events of interest. The events that occurred prior to or after the event of interest are examined for insights into the event of interest. This technique, known as event stream analysis, is emerging as an extremely powerful mechanism for understanding the exact usage and performance of a wireless system In conventional event stream solutions, however, the configuration state of the system is usually unavailable and it is therefore difficult to determine the root cause of a specific issue. The system can be functioning correctly but improperly configured, or the system can be configured correctly but still failing. The difference between the two scenarios is extremely important for determining proper problem resolution.

The inability to efficiently determine the configuration has been overcome by collecting a snapshot (a copy or capture of the entire data set of a device or system element) of the configuration of the system or device. In these systems, it is necessary to repeatedly collect a snapshot of the configuration of the system in association with every possible event of interest in order to perform event analysis. Unfortunately, the amount of information included in a snapshot is often too large to efficiently and effectively capture repeatedly. This problem is exacerbated by many potential events of interest not emerging as actual events of interest in subsequent analysis. As a result, many more events are captured than are analyzed completely, so a great deal of snapshots must be collected but never used.

In wireless devices, there are many different functions that are performed using the cellular systems. Devices, for example, are used to make telephone calls, send and receive email, text messages, photographs and video, perform calendaring functions, and the like. These functions typically have unique configuration data that substantially alter their operation and interaction with the network. Further the interaction of all of the various systems that enable the full functionality of a cellular device is quite complex, and in many cases the proper behavior cannot be determined simply from the configuration of a single application.

Requiring devices or functions in the devices to submit regular snapshots is an unworkable solution. If the amount of information in a single snapshot is too large to efficiently and effectively capture repeatedly, then the amount of information for the snapshots for all devices and sub-systems operating in a cellular network would be overwhelming. Systems and methods are needed for efficiently utilizing device configuration information to provide visibility into why a particular problem in the device or network occurred.

SUMMARY OF THE INVENTION

These and other limitations are overcome by embodiments of the invention, which relate to systems and methods for performing event stream analysis for devices such as mobile cellular telephones and other wireless devices. In one embodiment, the event stream analysis is applied with respect to the configuration of a device. In order to perform event stream analysis, deltas or changes to a device and/or the configuration of the device are tracked. More specifically, the delta events or changes to can be recorded at the device and forwarded to a server.

Often, the existing configuration of a device can be represented in a data structure such as a snapshot. A change to the configuration data of a device, for example, is a delta event. As indicated previously, recording the entire snapshot of a device when a delta event occurs can consume bandwidth, and cause other problems. The extent of this problem grows when considering the number of devices that operate in a wireless network. Embodiments of the invention enable changes to device configurations to be recorded. Event stream analysis uses the recorded data to analyze the device and the state of the device for various reasons, including issue resolution, network performance, and the like.

The recorded data can represent a sequence of events that illustrate how the device or the configuration of the device changed over time. By recording this sequence of events—an event stream—and applying it to a known configuration such as a previously recorded snapshot, the actual configuration of the device at a particular time can be determined. Applying event stream analysis in this manner, for example, helps provider to consider the specific configuration of a device when evaluating an issue that occurred in the past. This type of information may also provide insight to the provider when evaluating the performance of the device and/or the network.

When recording a delta event, the device or remote server typically identifies the time of the event, and the previous and current value of any metric or node associated or affected by the event. As successive events occur on a device, the collection of delta events form an delta event stream. The delta event stream or series of changes to the configuration data of a device can be maintained independently of a snapshot of the entire configuration data of a device. By applying the delta event stream or by applying the events in the delta event stream to a snapshot, the specific configuration of the device at any desired time can be determined.

In one embodiment, the event stream analysis begins by detecting an event on a device that occurs in the configuration data. The delta event is packaged along with identifying information such as time of the event, and previous and current values of any node or metric included in the event. Next, the delta event is forwarded to a server computer. The server computer adds the received delta event to an delta event stream associated with the device.

When an event of interest occurs (such as a dropped call, a failed application, a device reboot, etc.), the server or the device obtains a snapshot of the device using the delta event stream associated with the device. The snapshot can represent the state of the device before or after the time of the event of interest and can be obtained at any time. Then, the specific configuration of the device is identified by applying the event stream in either chronological or reverse chronological order (depending on when the snapshot was taken relative to the event of interest) until the configuration of the device at the time of interest is determined. This configuration, as well as context events that occurred prior to or just after the time of the event of interest, can be used in an analysis of the event of interest.

Alternatively, the invention allows the delta events to be utilized without the use of a snapshot at all. In some circumstance, the information that a change in configuration has occurred is sufficient to aid in analysis of an event of interest, without needing to fully recreate the complete device configuration.

Advantageously, embodiments of the invention include publishing changes to a device's configuration data to a configuration data system that is maintained by the server. The event stream and event stream analysis system is an example of a configuration data system. The specific configuration of a device at the time of an event of interest can add substantial value to any event analysis because the specific configuration can be part of the event or system analysis.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order that the manner in which the advantages and features of the invention are obtained, a particular description of the invention will be rendered by reference to specific embodiments thereof which are illustrated in the appended drawings. Understanding that these drawings depict only typical embodiments of the invention and are not, therefore intended to be considered limiting of its scope, the invention will be described and explained with additional specificity and detail through the use of the accompanying drawings in which.

DETAILED DESCRIPTION OF THE PREFERRED EMBODIMENTS

Embodiments of the invention relate to event stream analysis in devices including wireless devices. Event stream analysis, in one embodiment, refers to the process of analyzing events that occur in a wireless device. Changes (also referred to as events or deltas) to a device, including changes to the configuration of a device, can be recorded or tracked. The recordation of these events as they occur can result in a chronologically related event stream. This event stream can provide insight by itself or in combination with an existing device configuration with regard to the operation of the device and/or the operation of the wireless network. Thus, an event stream enables a wireless provider to characterize or evaluate events of interest in wireless devices that operate in wireless communications networks as well as the wireless communications networks themselves.

Embodiments of the invention also relate to systems and methods for collecting data such as an event stream from devices operating in the network. The collected data can be used to evaluate events of interest or other problems that occur with the device or in the wireless network. Advantageously, the ability to evaluate an event of interest that occurs in a wireless network by examining events that occurred prior to and/or after the event of interest can improve the performance of the device and/or of the network by facilitating the identification of the actual cause of any problem associated with the event of interest. Further, the event stream data from multiple devices can also be combined to identify the evaluation of an event of interest, particularly when the event impacts more than one device.

Embodiments of event stream analysis, for example, enable decisions to be made regarding whether a device is working properly, identify and rectify problem areas in networks, and specifically identify the problems or issues of the networks and/or the devices operating therein. Embodiments of the invention can be used with cellular telephones, but one of skill in the art can appreciate that other devices including pagers, laptop computers, personal digital assistants, or other devices that utilize wireless networks will also benefit from an analysis of an event stream. Embodiments of the invention can also be used in conjunction with wireless networks, towers, sectors, and the like.

For a cellular telephone, a wireless call or other use typically generates certain data or metrics that can be reported by the telephone. RF metrics, transaction metrics, location metrics, and the like, are examples of data that can be collected by a device when a call or other use of the device is made. These metrics can be collected and later analyzed regardless of whether the call was a good call or a bad call and regardless of the type of call that was made. Data can also be collected for devices that do not actually achieve a network connection.

Certain embodiments of the invention also include the ability to specify event collection instructions for a specific device. The event collection instructions allow a subset of events from a device to be identified, filtering the total event stream into a small set more closely related to specific events of interest. By applying the event collection instruction on the device itself, the number of events that need to be uploaded can be dramatically reduced. The event collection instructions can also be implemented on a set of devices in order to gain a holistic view of specific events.

Embodiments further enable a device to collect events that include metrics relating to the configuration data of the device. The metrics included in the collected events enable the device itself or a remote server to analyze an event stream (which includes one or more delta events) of the device. Embodiments of the invention also eliminate the need to take repeated snapshots of the entire configuration data of a device.

When the configuration of the device changes, an event may be generated. The event identifies what changed in the configuration and may also include the previous and current values for the change. One advantage of tracking and recording these comparatively smaller events (compared to an entire snapshot of the configuration data), is that only a single snapshot of the device's configuration may be required in order to reconstruct the configuration of the device at a particular time of an event of interest. Further, the snapshot can be taken before of after the event of interest. As previously stated, there are instances where the comparatively small event stream is sufficient to evaluate the event of interest.

Embodiments of the invention therefore relate to event stream analysis that includes delta events. With a snapshot of the device, the tracked delta events of a device can be used to reconstruct the configuration of a device at the time an event of interest occurred. In addition, events on a device or other system element can have an impact on and may even be the root cause of a specific problem. The ability to include device events and device configurations in system analysis improves the analysis. Thus, the systems and methods described herein enable configuration of a device or other system element to be efficiently included in event analysis as well as network analysis.

While embodiments of the invention are discussed in the context of a wireless network, one of skill in the art can appreciate that embodiments of the invention are equally applicable to any connected client system such as the Internet, 802.xx based networks, wireless networks, and the like or any combination thereof. In addition, the scope of embodiments of the invention includes wireline and/or wireless connected networks. The following discussion provides additional details of embodiments of the invention including a description of an exemplary environment for implementing embodiments of the invention.

Figure 1:
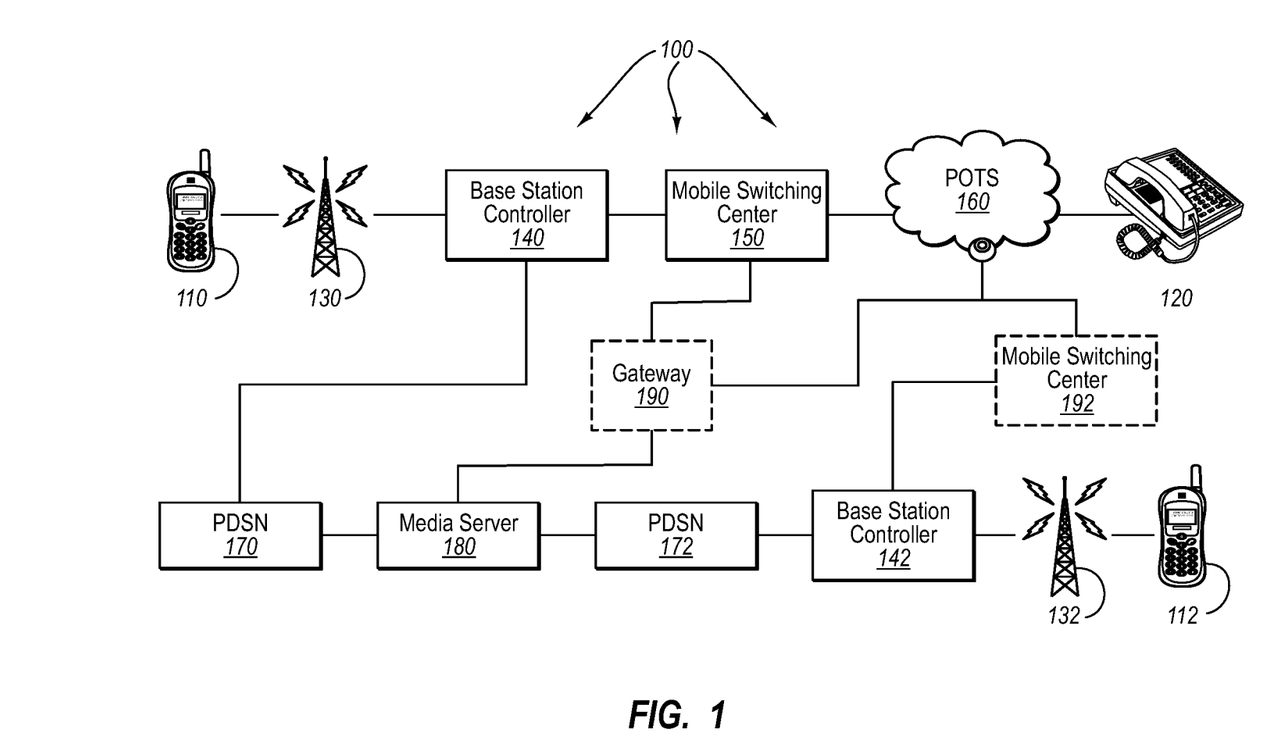
FIG. 1 illustrates one embodiment of a communications network over which wireless communications can be transmitted.

FIG. 1 illustrates an exemplary environment for implementing embodiments of the invention. As shown, a wireless device 110 can communicate with another wireless device 112 or a land line device 120 through various network components of network 100, including base station 130 and 132, base station controllers 140 and 170, mobile switching centers 150 and 192, POTS 160, PDSN nodes 170 and 172, media server 180, and/or voice over IP to POTS gateway 190.

In this example, the base station 130 operates as an access point through which wireless clients gain access to other wireless clients and the communications network 100. The base station 130 has a corresponding serviceable range for which it can provide service and network access to the wireless communications device 110. Because the wireless device 110 can be mobile and move out of the serviceable range of the base station 130 during a call, several different base stations may actually be employed to provide continuous service to the wireless device 110 while moving through the different serviceable ranges of different base stations.

The wireless device 110 generally enables a user to gain access to telephony services and to transmit and receive and output voice data. In certain circumstances, the wireless device can also provide access to other networks including Internet as well as to multimedia content. The wireless device 110 can be substantially any mobile wireless device, such as a wireless telephone, a personal digital assistant (PDA), a laptop computer, a pager, and the like or any combination thereof. The wireless device 110 can also be referred to as a mobile station, a mobile device, or wireless device. In addition, embodiments of the invention are described in the context of a cellular wireless network or system. One of skill in the art, with the benefit of the teachings contained herein, will realize the applicability of embodiments of the invention to other wireless networks including IP based networks, 801.xx networks, and the like or any combination thereof.

The form factor, or physical characteristics of the communications devices should not be construed as limiting factors of the invention. Although, in many embodiments, the wireless device 110 has a local memory that is used to locally store data that is transmitted over the network 100 and to enable buffering. The wireless device can also include other components, such as, but not limited to, a radio transmitter and receiver, circuits for voice encoding and decoding and for call control, a Subscriber Identity Module (SIM) chip, a display device, a keyboard, and a power supply.

In addition, the device 110 typically has multiple features that may result in connections with other networks including IP based networks and the like. For example, email applications, instant messaging applications, calendaring applications, camera functions, and the like are examples of applications that may require the device 110 to interact with other networks and systems. Thus, the configuration of the device 110 includes network configurations, application configurations, and the like.

The base stations typically operate under to the control of corresponding base station controllers. For example, the base station controller 140 receives and transmits communications sent to and received from base station 130. Base station controller 140 also interfaces with other communications nodes of the network 100, as reflected in FIG. 1.

In network 100, wireless device 110 accesses voice and data services with the assistance of mobile switching center 150, which routes telephone calls and data sessions on behalf of the wireless device 110. The mobile switching center 150 establishes traffic channels (e.g., voice channels and data channels) between the base station controller 140 and wireless device 110 through which communications are transmitted to and received from the wireless device 110. The mobile switching center can also route telephone calls to another MSC (Mobile Switching Center 192), to the plain old telephone system (POTS) 160 also referred to as the public switched telephone network (PSTN), or another telephone server or gateway (e.g., media server 180 and gateway 190), thereby allowing the wireless device 110 to communicate with substantially any other telephone, whether wireless or wired.

FIG. 1 also illustrates how the wireless device 110 can be connected with the land line device 120 over a data channel through base station 130, base station controller 140, PDSN, 170, media server 180, gateway 190 and POTS 160. The wireless device 110 can also be connected with another wireless device 112 over a data channel through 130, the base station controller 140, a PDSN (Packet Data Servicing Node) 170, a media server 180, PDSN 172, base controller station 142 and base station 132.

The PDSN (Packet Data Switching Nodes) 170 and 172 generally provide the wireless devices 110 and 112 mobile IP access to the Internet, so that the wireless device 110 can access the Internet though network 100. PDSN 170 is compatible with any of a number of protocols, including HyperText Transfer Protocol (HTTP), Session Initiation Protocol (SIP), Real-Time Protocol (RTP) and others. By supporting these various protocols, PDSN 170 enables the wireless device 110 to access various types of Internet and multimedia data, such as web pages, Voice Over IP (VOIP), instant messaging, audio, video, etc. Each of the protocols supported by PDSN 170 has an appropriate gateway or interface with the network 100, such as media server 180 and gateway 190.

Although the foregoing description has been provided largely with regard to PDSN 170, it will be appreciated that PDSN 172 is correspondingly similar to PDSN 170. Likewise, in terms of functionality and capabilities, base station controller 142 is correspondingly similar to base station controller 140, base station 132 is correspondingly similar to base station 130, wireless device 112 is correspondingly similar to wireless device 110, and mobile switching center 192 is correspondingly similar to mobile switching center 150.

In operation, the user of the wireless device 110 initiates communication with the wireless network 100 by requesting either a voice session or a data session. The information specifying either the voice session or the data session is transmitted to the associated base station controller 140 and a session type is requested. In the event of a voice session, the base station controller 140 communicates with the mobile switching center 150, which in turn communicates with the POTS 160 to establish a telephone call using a voice channel with the appropriate land line 120 or other wireless device 112.

In the event of a data session, the base station controller 140 communicates with PDSN 170 to establish a data channel connection between the wireless device 100 and the appropriate other device (e.g., land line 120 or wireless device 112) through media server 180 and gateway 190. It will be appreciated, however, that although gateway 190 and media server 180 are shown as separate components, they can actually comprise the same component and do not need to be physically separated. One example of gateway 190 is a voice-over IP to POTS gateway, such as the H323 gateway.

Figure 2:
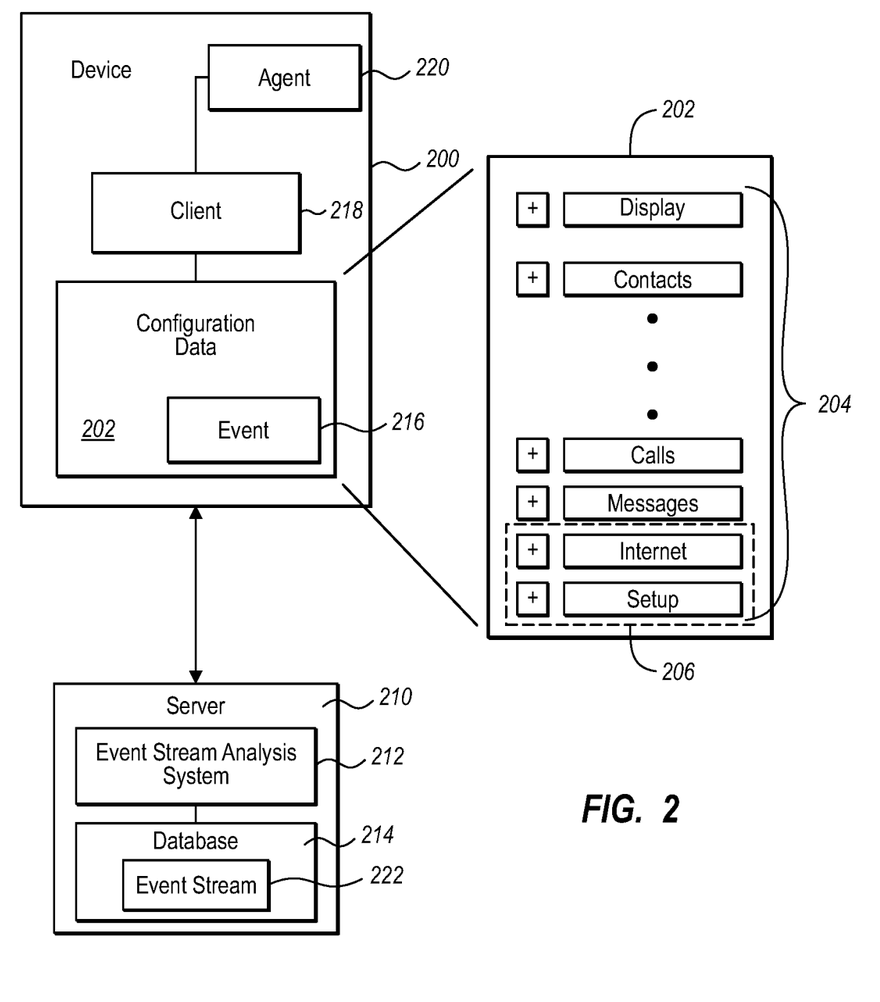
FIG. 2 is a block diagram illustrating exemplary systems and methods for tracking events in a device for event stream analysis.

Although many of the foregoing network components have been described in some detail, it will also be appreciated that other network configurations including the same or different network components can also be utilized during implementation of the present invention. In particular, the overall system described is reflective of a typical CDMA 1×RTT deployment. Other cellular radio and cellular system technologies such as GSM, GPRS, UMTS, W-CDMA, CDMA EvDO, and CDMA EvDO rev A perform substantially similar functions—allowing mobile device access to voice and data services—via different functional elements and network architectures. Embodiments of the invention can be implemented in any of these and other networks. FIG. 2 is a block diagram illustrating systems and methods for delta state tracking for event stream analysis. The event stream analysis, in this example, is described in view of the device 200, but could be applied to any other device or network element operating in a wireless network. The event stream analysis described herein can be performed on the server side or on the client side.

The device 200 includes configuration data 202. The configuration data 202 includes configuration information needed to ensure that the device 200 functions correctly. When the device 200 is initially set-up, for example, the configuration data 202 may be remotely provisioned by the relevant wireless provider. The wireless provider, for example, pushes configuration information to the device 200. Systems such as, by way of example, OTA and OTASP, IOTA and OMA-DM provide mechanisms for remotely managing the configuration data 202 of the device 200. Although these systems may initially provision a device, they do not typically have an accurate record of the device's configuration at all times because the configuration data 202 can be changed from various sources including, user activity, other provisioning system events, and application events.

In order to more effectively provision devices remotely, devices have begun to adopt a hierarchical directory such as the tree 204. The tree 204 includes all of the parameters for any application and function of the device 200. Exemplary entries may include display data, contacts data, call data, messages data, Internet data, and setup data. The entries in the tree 204 provide the configuration needed to enable the various features and functions of the device 200, but do not necessarily store the user's actual data (e.g., contact telephone numbers, emails, etc.).

The tree 204 can be extensive and complex, especially in view of the complex interactions between various systems. The tree is typically structured so that data related to a specific application or function resides in one area of the tree, known as a subtree. While an application subtree contains the data directly associated with the application, it may not contain all of the configuration data associated with services the application depends on. For example, a subtree may contain the configuration associated with an e-mail application. But the subtree may not contain information about IP configuration or radio configuration, both of which must function correctly for email to work as expected. As a result, a snapshot of just a specific subtree is typically not sufficient to allow understanding of device configuration.

In this example, the configuration data 202, of which the tree 204 is one representation, is managed by the client 218.

When a change occurs or is made to the configuration data 202, an event 216 is generated by the client 218. The event 216 is small compared to the tree 204—it only indicates what changed—and it is more feasible to communicate the event 216 to the server 210. The device 200 can communicate the event 216 to the server immediately, at a later time, or in a group with other delta events.

In this example, the event 216 includes the specific setting that changed, the previous value of the setting, the current value of the setting, and/or a time of the event 216. Other information can also be included in the event 216, such as the location of the device, sectors available to the device, radio properties, and the like. While it is not strictly necessary to include both the starting and ending values of the specific setting, their inclusion allows the event analysis to occur in either chronological or reverse chronological order. This is advantageous in many situations, but in some situations, in particular if the setting is large, it may be more practical to only include one of the values. Other approaches are also possible for reducing the size of the events, including compression and differencing. The event 216 may also include additional information as well. The event 216 can be adapted to include what made the change to the configuration data, such as the application that was currently running on the device 200 and the like.

The event 216 is eventually provided to a server 210, potentially along with other events. When sent to the server, the event stream analysis system 212 then stores the event 216 in the database 214. The events associated with the device 200 in the database 214 can be grouped or stored in a manner such that the events for the device 200 can be viewed collectively.

All of the events generated by the client 218 on the device 200 collectively form the event stream 222 that is stored at the server 210. The event stream 222 could optionally be stored at the device 200 and the agent 220 may be able to perform some analysis of the event stream 222. The event stream 222 provides a definitive tracking of the state or of the configuration of the device 200. The event stream 222 provides a complete understanding of the instantaneous system configuration at different times from any starting point. Because configuration changes on a device 200 are often infrequent, the event stream 222 is manageable and typically has a relatively small size.

During the event stream analysis by the event stream analysis system 212, an event of interest is identified. One example of an event is poor browsing performance. Another example of an event is failure for a device to collect a message from a server. The event stream represents both the failing event and contributing events leading up to the failing event. For a typical data application such as email, the contributing events include, by way of example, radio session establishment and throughput, IP connection set up and throughput, and email application launch, connection, and data transactions. These are examples of events that have change the state or configuration of a device. In fact, changes to the configuration of a device can be automatic, in response to the execution of applications, automatically initiated by the device or a remote server, temporary in nature, and the like or any combination thereof.

The event stream analysis system 212 processes the event of interest and/or the contributing events to better characterize the event of interest. All of the contributing events are an indication of what actually occurred on the device. However, one goal of the system is to identify why the event stream in question occurred. To determine this, the underlying configuration of the device during the sequence of events in question is useful. For example, an email transaction can fail because the radio throughput was poor enough that adequate data could not be exchanged. A very similar failure scenario can occur if the device is configured incorrectly and using network elements that are overloaded or performing poorly. The distinction between the two scenarios is made practical by analyzing the exact device configuration during the event stream.

One aspect of event stream analysis is the need to analyze a specific event of interest that is determined after the series of events has occurred. In typical implementations of the event stream analysis system, the processing of a series of events can occur days after the events in question occurred. Further, only a limited number of events may be analyzed by the system for various reasons. As a result, it may not be practical to capture and upload the configuration data associated with every event that might be of interest. It may be difficult to get an accurate representation of the device configuration at the time of the event of interest by querying the device in question at the time of analysis, because its configuration may have changed in the time between the event of interest and the time of analysis.

However, the known configuration starting point that provides context for the event stream 222 can be collected before or after an event of interest occurs. In particular, once an event of interest has been identified for further analysis, the current configuration state of the device can be read. For instance, the entire configuration may be received by a server. By then applying the delta state events stored in the event stream in reverse chronological order (assuming the entire configuration was obtained after the event or interest), the configuration at the time of the event of interest can be determined. Alternatively a previously existing snapshot can be used and the delta state events can be applied chronologically.

For example, a snapshot of the configuration data 202 or a starting point for event stream analysis can be obtained or identified when the device 200 is initially provisioned. Alternatively, the last known configuration of the device 200 can be obtained from the server 210 or other location. In yet another embodiment, a snapshot of the device 200 can be taken at the time of analysis. In any of these cases, the event stream 222 can then be applied to the snapshot (either forwards or backwards in time) to arrive at the desired configuration at the time of the relevant event.

In addition, the event stream 222 enables the provider to examine changes that occurred before and after the event of interest. In some instances, the actual configuration information may not be needed. Rather, the fact that something changed in the configuration data at a certain point in time is needed in the analysis of the event stream.

In one embodiment, the client 218 manages the configuration data 202 or the tree 204 and is configured to publish metrics to an agent 220 when a node of the tree 204 changes. Thus, an event 216 is published to the agent 220. The metrics included in the event 216 include, by way of example only, time, node identification, previous value, and current value. The metrics may be specific to a particular node of the tree 204, to a branch of the tree, or to another portion of the tree. For example, metrics of the area 206 of the tree 204 may be included in the event 216 published to the agent 220. In one embodiment, no values may be needed in the metrics. Rather the fact that a change occurred in the configuration data 202 is included in the event 216. The agent 220 treats the metrics in the event 216 as it does other event metrics. The agent 220 may perform filtering, recording, storing, forwarding, uploading, and the like.

In this example, the event 216 and included change metrics are uploaded to the server 210.

An alternative analysis model can utilize the delta event itself as an indicator of a likely root problem. For example, assume that a user changes his or her email password. On the next access, the email stops working and provides a password error. In context, these events with respect to the event of interest suggest that the likely root error is user change rather than corruption of the network data, application error, or change in account status. Since user error is a common cause of failed access, the event collection instruction surrounding a user error could include capturing the last several delta change events. Even though the exact state of the entire tree is not available, and the correct user password is not known, the fact that the user changed the password entry immediate before encountering a password error is indicative of the root issue. Thus, the event stream can include context events which, in one embodiment, correspond to events that occur prior to or after the time of the event of interest but do not capture all delta events.

The filtering of the delta events can be based on many different algorithms. One possibility is to only collect a limited number of delta events before the potential event of interest. Another possibility is to associate a potential event of interest with specific delta events, so only delta events that potentially applied to the area of interest are reported. Another option is to limit the time frame, and only to report delta events that occur in the time immediately surrounding the potential event of interest.

Using the events 216 received from the device 200, the server can perform server side event stream analysis and can build snapshots of the tree 204 or more generally of the configuration data 202.

Figure 3:
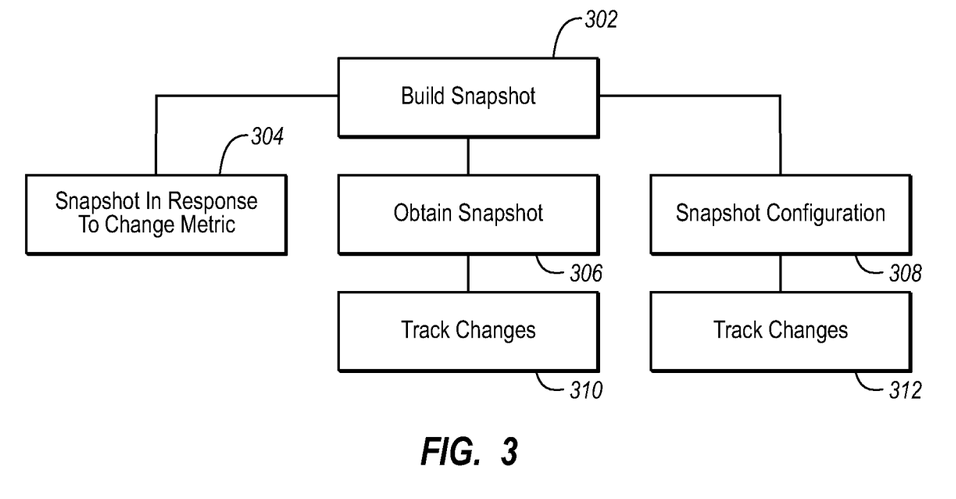
FIG. 3 illustrates exemplary methods for obtaining a snapshot of a device's configuration data.

FIG. 3 illustrates various methods to build 302 a snapshot. In one example, a snapshot 304 of the configuration data of the device is obtained in response to a change metric. In other words, the server may be aware than something on the device has changed and then proceed to read the change and/or read the entire configuration structure.

In another embodiment, the server obtains 306 a previous copy of the snapshot and then uses the event stream to track changes 310 in the snapshot of the configuration data until the needed state of the configuration data is obtained. In another embodiment, the snapshot 308 of the configuration data is taken at the time of the analysis (usually after the event in question), and the event stream is used to track changes 312 backwards up to the configuration of the device at the time in question. The events in the event stream are preferably applied in either forward or reverse chronological order based on when the event in question occurred relative to the starting point of the event stream analysis.

The snapshot of the device 200 can be obtained in various ways. With continuing reference to FIG. 2, a query can be sent to the server 210 for the snapshot. The server 210 can then retrieve a reference copy of the snapshot or read the current state of the configuration data 202 directly from the device. Alternatively, the snapshot may be part of a directive to the agent 220 to read the configuration data 202 as a metric, which can then be reported to the server 210 like other metrics. Alternatively, the events 216 can be used to update a copy of the snapshot. In this case, the configuration data 202 at the device 200 can be synchronized to with the server's copy of the configuration data. Even though the snapshot copy may not be synchronized, the event stream 222, whether stored at the server 210 or the device 200 can be used to reconstruct prior versions of the configuration data.

Figure 4:
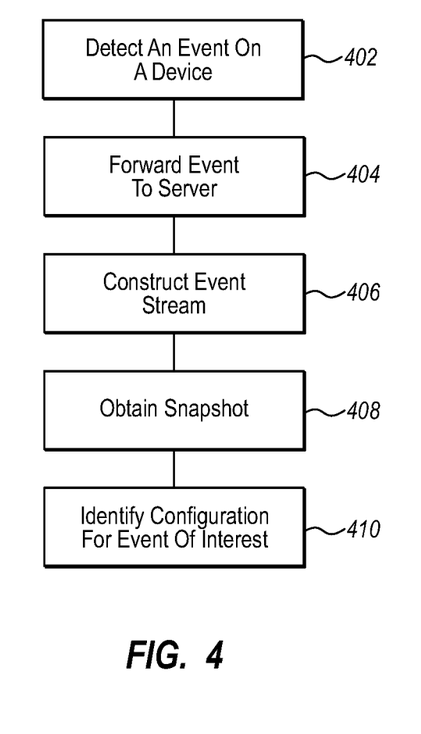
FIG. 4 is an exemplary flow diagram for performing event stream analysis.

FIG. 4 illustrates an exemplary flow diagram for delta state tracking for event stream analysis. This example of delta state tracking for event stream analysis begins by detecting 402 an event on a system device, such as a device or other network element. The detection of an event is usually reported to an agent operating on the device. The agent can forward 404 the event to a remote server, which adds the event to a data base to construct 406 an event stream. The agent can be forwarded on a per event basis when the event occurs. Alternatively, the agent can store multiple events and then forward a small event stream to the server at a later time.

The delta event stream, as previously described, is a series of one or more delta events, but is typically small in comparison to the entire configuration data of a device. As a result, forwarding delta events and constructing delta event streams consumes few resources, but can be beneficial when an event of interest occurs and system analysis is performed. In one embodiment, the delta event stream can be stored on the device and then provided to the server only when an analysis is performed.

When an event of interest does occur and event stream analysis is performed, the event stream stored at the server can be useful by enabling the configuration of the device to be considered during the analysis of the event of interest. More particularly, the event stream, in combination with a snapshot of the device in some embodiments, can be used to reconstruct the configuration of the device at the time of the event of interest. In addition, changes to the configuration data can be viewed prior to and after the event of interest.

As a result, a snapshot is typically obtained 408. The snapshot can be from any source or can be taken when needed. Thus, the snapshot of the configuration data can be from when the device was initially provisioned, taken after the event of interest, or from other sources as described herein. With the snapshot, the event stream is used to identify 410 the configuration data at the time of the event of interest. Depending on the context of the snapshot, the events in the event stream are applied either chronologically or in reverse chronological order until the configuration data of the device at the time of the event of interest is identified. This configuration can then be part of the system analysis. In other words, the deltas or events that occur to a device can be used as part of the system or device analysis.

The embodiments described herein may include the use of a special purpose or general-purpose computer including various computer hardware or software modules, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

The present invention may also be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   receiving, by a server comprising a processor, event data representative of an event from network equipment, wherein the event corresponds to a change in a configuration of the network equipment and wherein the event data comprises a metric, a first time of the event, a sector available to the network equipment, a previous value of the metric and a current value of the metric;
   adding, by the server, the event to an event stream associated with the network equipment, wherein the event stream comprises events that are chronologically related;
   obtaining, by the server, a snapshot of the configuration of the network equipment at any time relative to an occurrence of an event of interest;
   determining, by the server, a configuration of the network equipment by applying at least a portion of the events in the event stream to the snapshot, wherein the configuration is a configuration of the network equipment at a second time that the event of interest occurred; and
   analyzing, by the server, the event of interest based on the configuration of the network equipment to determine a cause of the event of interest, wherein analyzing the event of interest comprises examining at least one of the events in the event stream in a context of the event of interest; and
   in response to analyzing the event of interest and based on the event stream, reconstructing, by the server, a prior configuration of the network equipment.

2. The method of claim 1, further comprising:
   obtaining, by the server, the snapshot at a third time prior to the event of interest or at a fourth time after the event of interest.

3. The method of claim 2, further comprising:
   applying, by the server, the portion of the events in chronological order in response to the snapshot being obtained at the third time prior to the event of interest and applying the portion of the events in reverse chronological order in response to the snapshot being obtained at the fourth time after the event of interest.

4. The method of claim 1, wherein the event stream identifies a chronological relationship between the events associated with the network equipment.

5. The method of claim 1, wherein the configuration comprises at least a portion of an entire configuration of the network equipment.

6. The method of claim 5, wherein the configuration comprises configuration information about applications and functions of the network equipment.

7. The method of claim 1, further comprising:
   detecting, by the server, the event and identifying the metric to include in the event.

8. The method of claim 1, further comprising:
   identifying, by the server, a problem relating to the network equipment or the network based on an analysis of the event of interest and the event stream.

9. A system, comprising:
   a processor; and
   a memory that stores executable instructions that, when executed by the processor, facilitate performance of operations, comprising:
   receiving event data, representative of an event, wherein the event corresponds to a change in a configuration of network equipment, and wherein the event data comprises metrics associated with the event, an event time, a sector available to the network equipment, a previous value of a previous metric and a current value a current metric;
   adding the event to an event stream associated with the network equipment, wherein the event stream comprises events that are chronologically related;
   generating a snapshot of the configuration of the network equipment at a time relative to an occurrence of an event of interest;
   in response to generating the snapshot, determining the configuration of the network equipment by applying an event in the event stream to the snapshot, wherein the configuration is the configuration of the network equipment at the time relative to the occurrence of the event of interest;
   based on the configuration of the network equipment, analyzing the event of interest to determine a cause of the event of interest, wherein analyzing the event of interest comprises examining the event in the event stream in a context of the event of interest; and in response to analyzing the event of interest and based on the event stream, reconstructing a prior configuration of the network equipment prior to the configuration.

10. The system of claim 9, wherein the metrics comprise a radio frequency metric, a transaction metric, and a location metric.

11. The system of claim 9, wherein the operations further comprise:
collecting a limited number of the events before a potential event of interest;
associating the potential event of interest with specified events;
reporting the specified events to a server; and
limiting the events that are reported to the server to a time frame associated with the event of interest.

12. The system of claim 9,
wherein the events comprise changes to the configuration at or near the time relative to the occurrence of the event of interest.

13. A non-transitory machine-readable medium, comprising executable instructions that, when executed by a processor, facilitate performance of operations, comprising:
detecting a change to configuration data of a mobile device, resulting in changed configuration data associated with a changed configuration;
storing event data that reflects the change, wherein the event comprises the change to the configuration data, a metric associated with the change, a first time of the change, a previous value of the changed configuration data and the metric, and a current value of the changed configuration data and the metric;
associating the event with an event stream of the mobile device that comprises events, wherein the events in the event stream are chronologically related;
identifying an event of interest for analysis, wherein the events of the event stream comprise first events that have been determined to have occurred before a second time of the event of interest and second events that that have been determined to have occurred after the second time of the event of interest;
in response to identifying the event of interest, analyzing a performance of the mobile device related to the event of interest using the event stream, wherein analyzing the performance comprises analyzing the events in the event stream that occurred at, before, and after the second time of the event of interest and in response to analyzing the performance, reconstructing a prior configuration that is different than the changed configuration of the mobile device.

14. The non-transitory machine-readable medium of claim 13, wherein the operations further comprise:
operating an agent at the mobile device to monitor the configuration data, wherein the agent generates the events in response to changes to the configuration data, and wherein the agent transmits the events to a server as the events occur at the mobile device or in batches when a batch size for events is reached.

15. The non-transitory machine-readable medium of claim 14, wherein the agent is configured to perform at least a portion of analyzing the performance of the mobile device.

16. The non-transitory machine-readable medium of claim 13, wherein the operations further comprise:
obtaining a snapshot of at least a portion of a first configuration of the mobile device at a third time relative to the event of interest; and
applying a portion of the events in the event stream in either chronological order or reverse chronological order to obtain a specific configuration of the mobile device, wherein the specific configuration of the mobile device is a second configuration of the mobile device as of the second time that the event of interest occurred.

17. The non-transitory machine-readable medium of claim 16, wherein the operations further comprise generating additional configurations of the mobile device that correspond to configurations of the mobile device prior to the second time of the event of interest and after the second time of the event of interest.

18. The non-transitory machine-readable medium of claim 16, wherein the specific configuration comprises a portion of an entire configuration of the mobile device or comprises the entire configuration of the mobile device.

19. The non-transitory machine-readable medium of claim 13, wherein the event of interest is an indicator of a threshold likely root problem associated with the mobile device.

20. The non-transitory machine-readable medium of claim 13, wherein the operations further comprise:
analyzing the performance of the mobile device and the event of interest based on event streams from other mobile devices other than the mobile device and based on configurations of the mobile devices that experience a same event of interest as the event of interest.

* * * * *